US011653626B2

(12) United States Patent
Smith

(10) Patent No.: US 11,653,626 B2
(45) Date of Patent: May 23, 2023

(54) LIVESTOCK WATERING APPARATUS

(71) Applicant: Terence Fraser Lee Smith, Consort (CA)

(72) Inventor: Terence Fraser Lee Smith, Consort (CA)

(73) Assignee: Terence Fraser Lee Smith, Consort (CA)

( * ) Notice: Subject to any disclaimer, the term of this patent is extended or adjusted under 35 U.S.C. 154(b) by 247 days.

(21) Appl. No.: 17/116,467

(22) Filed: Dec. 9, 2020

(65) Prior Publication Data

US 2021/0169044 A1      Jun. 10, 2021

(30) Foreign Application Priority Data

Dec. 10, 2019   (CA) ................................ CA 3064455
Aug. 20, 2020   (CA) ................................ CA 3090612

(51) Int. Cl.
*A01K 7/00*   (2006.01)

(52) U.S. Cl.
CPC ..................... *A01K 7/00* (2013.01)

(58) Field of Classification Search
CPC .......... A01K 7/00; A01K 7/005; A01K 7/025; A01K 7/027; A01K 7/06; A01K 5/00; A01K 5/008
See application file for complete search history.

(56) References Cited

U.S. PATENT DOCUMENTS

| | | | | |
|---|---|---|---|---|
| 844,277 | A * | 2/1907 | Gertzen et al. | A01K 39/024 |
| | | | | 119/80 |
| 2,796,312 | A * | 6/1957 | Townsend | A01K 7/025 |
| | | | | 49/250 |
| 3,745,977 | A * | 7/1973 | Martin | A01K 7/04 |
| | | | | 119/73 |
| 4,078,524 | A * | 3/1978 | Peterson | A01K 7/027 |
| | | | | 119/71 |
| 4,130,090 | A | 12/1978 | Bohlman | |
| 4,559,905 | A | 12/1985 | Ahrens | |
| 4,570,576 | A * | 2/1986 | Noland | A01K 7/02 |
| | | | | 119/73 |
| 4,584,966 | A * | 4/1986 | Moore | A01K 7/00 |
| | | | | 137/236.1 |
| 4,704,991 | A * | 11/1987 | Moore | A01K 7/027 |
| | | | | 119/73 |
| 4,883,022 | A | 11/1989 | Barker | |
| 6,722,313 | B2 | 4/2004 | Wenstrand | |
| 6,776,121 | B2 * | 8/2004 | Anderson | A01K 7/022 |
| | | | | 119/76 |
| 7,975,649 | B2 | 7/2011 | Barker | |

(Continued)

FOREIGN PATENT DOCUMENTS

CA           2174372 A1      8/1997

*Primary Examiner* — Ebony E Evans
(74) *Attorney, Agent, or Firm* — Gowling WLG (Canada) LLP

(57) ABSTRACT

Disclosed herein are livestock watering apparatuses comprising: a receptacle to be positioned in a water source, the receptacle having an open bottom region to be positioned within the water source and an opening in a side thereof positioned above and out of the water source, and the receptacle being at least partially insulated; and a lid for selectively accessing the water source, the lid being hingedly connected the receptacle and accessible through the opening in the side of the receptacle.

19 Claims, 6 Drawing Sheets

(56) References Cited

U.S. PATENT DOCUMENTS

| | | |
|---|---|---|
| 8,161,907 B2 | 4/2012 | Craig |
| 2004/0045510 A1* | 3/2004 | Duenow .................. A01K 7/06 |
| | | 119/75 |
| 2004/0221817 A1 | 11/2004 | Hatfield |
| 2011/0162583 A1* | 7/2011 | Rostamo .............. A01K 5/0128 |
| | | 119/61.5 |

* cited by examiner

LIVESTOCK WATERING APPARATUS

CROSS-REFERENCE TO RELATED APPLICATIONS

This application claims priority to and benefit of Canadian Patent Application Serial Number 3,064,455 filed on Dec. 10, 2019 and Canadian Patent Application Serial Number 3,090,612 filed on Aug. 20, 2020. The disclosures of each of these Canadian patent applications is incorporated herein by reference in their entirety.

TECHNICAL FIELD

The present disclosure generally relates to livestock watering apparatuses. More specifically, the present disclosure relates to insulated livestock watering apparatuses for remote pasture use.

BACKGROUND

During winter months, ranchers and producers may face significant challenges tending to the basic needs of their livestock. For example, in North America and other parts of the northern hemisphere, winter conditions can include temperatures of about 0° C. to about −40° C. or colder. Such conditions may take a toll not only on the livestock, but also on the equipment used to for the feeding, watering, and sheltering thereof.

The challenges presented by the winter season are generally augmented for ranchers or producers tending remote pastures—i.e. pastures where utilities such as electricity and running water may not be available. That is, while remote pastures may be useful for grazing management practices in that they may provide an abundance of tree shelterbelts for protection from winter storms as well as winter foliage sources, the remote pastures often lack power sources and other infrastructure, and present constrictive terrain, making it difficult to install equipment for feeding, watering, and sheltering the livestock.

Ranchers and producers using remote pastures often rely on direct watering means such as sloughs, lakes, dugouts and other bodies of water to provide water to livestock, thereby avoiding the need to install equipment such as intake water lines, wet wells, and pumps, which generally require one or more power sources. However, direct watering of livestock via a body of water can also be difficult during winter because the bodies of water freeze, rendering the water contained therein inaccessible. As a result, ranchers and producers are often required to cut holes through ice formed on the bodies of water so that livestock can access the water source.

However, cutting holes in ice can present a number of challenges. For example, the holes in the ice can be difficult for the livestock to see in low-visibility conditions (e.g. winter storms). Further, it can take about 15 minutes to about 20 minutes to cut a suitable hole in the ice, which, during harsh winter conditions, can be particularly difficult. As well, holes formed in the ice may quickly freeze over and, as a result, the ranchers or producers may be required to make frequent visits to the water source in order to reform the holes in the ice. Additionally, if the ranchers or producers are delayed in reforming the ice holes, the livestock may venture out onto the ice in search of an ice hole, which presents a number of readily apparent risks. Livestock, as a result, may become increasingly dependent on the ranchers or producers and may become increasingly dependent on the foliage located immediately around the water source.

Thus, there remains a need for a livestock watering apparatus that is useable in remote pastures (i.e. without a power source or water lines) and that is functional in winter conditions without needing to be regularly maintained.

SUMMARY

The present disclosure recognizes that there are problems in the current existing technologies in respect of livestock watering systems, including those intended for use in remote pastures.

Thus, according to one aspect of the present invention, there is provided a livestock watering apparatus comprising: a receptacle to be positioned in a water source, the receptacle having an open bottom region to be positioned within the water source and an opening in a side thereof to be positioned above and out of the water source, and the receptacle being at least partially insulated; and a lid for selectively accessing the water source, the lid being hingedly connected to the receptacle and accessible through the opening in the side of the receptacle.

According to a further aspect of the present invention, there is provided a method for watering livestock, the method comprising: inserting into a hole in a layer of ice formed on a water source an at least partially insulated receptacle having an open bottom region and an opening in a side thereof such that the open bottom region is positioned in the water source and the opening is positioned above the layer of ice, wherein the receptacle comprises a lid hingedly connected to the receptacle for allowing livestock to selectively access the water source through the opening in the side thereof.

According to a yet further aspect of the present invention, there is provided a use of the livestock watering apparatus described herein for watering livestock.

According to a yet further aspect of the present invention, there is provided a combination livestock watering and feed apparatus comprising: a receptacle having an open bottom region for being positioned in a water source and an opening in a side thereof for being positioned above and out of the water source, and the receptacle being at least partially insulated; a removable feed tray for storing thereon a livestock feed, the removable feed tray to be positioned within the receptacle when the receptacle is positioned out of the water source; and a lid for selectively accessing the water source or the removable feed tray, the lid being hingedly connected to the receptacle and accessible through the opening in the side of the receptacle.

According to a yet further aspect of the present invention, there is provided a method of training livestock to use a livestock watering apparatus, the method comprising: providing livestock access to the watering apparatus as described herein or the combination livestock watering and feed apparatus as described herein; and maintaining in an open position the lid to thereby allow the livestock to access the inside of the receptacle through the opening in the side of the receptacle.

Other aspects and features of the methods of the present disclosure will become apparent to those of ordinary skill in the art upon review of the following description of specific embodiments.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

DETAILED DESCRIPTION

Figure 1:
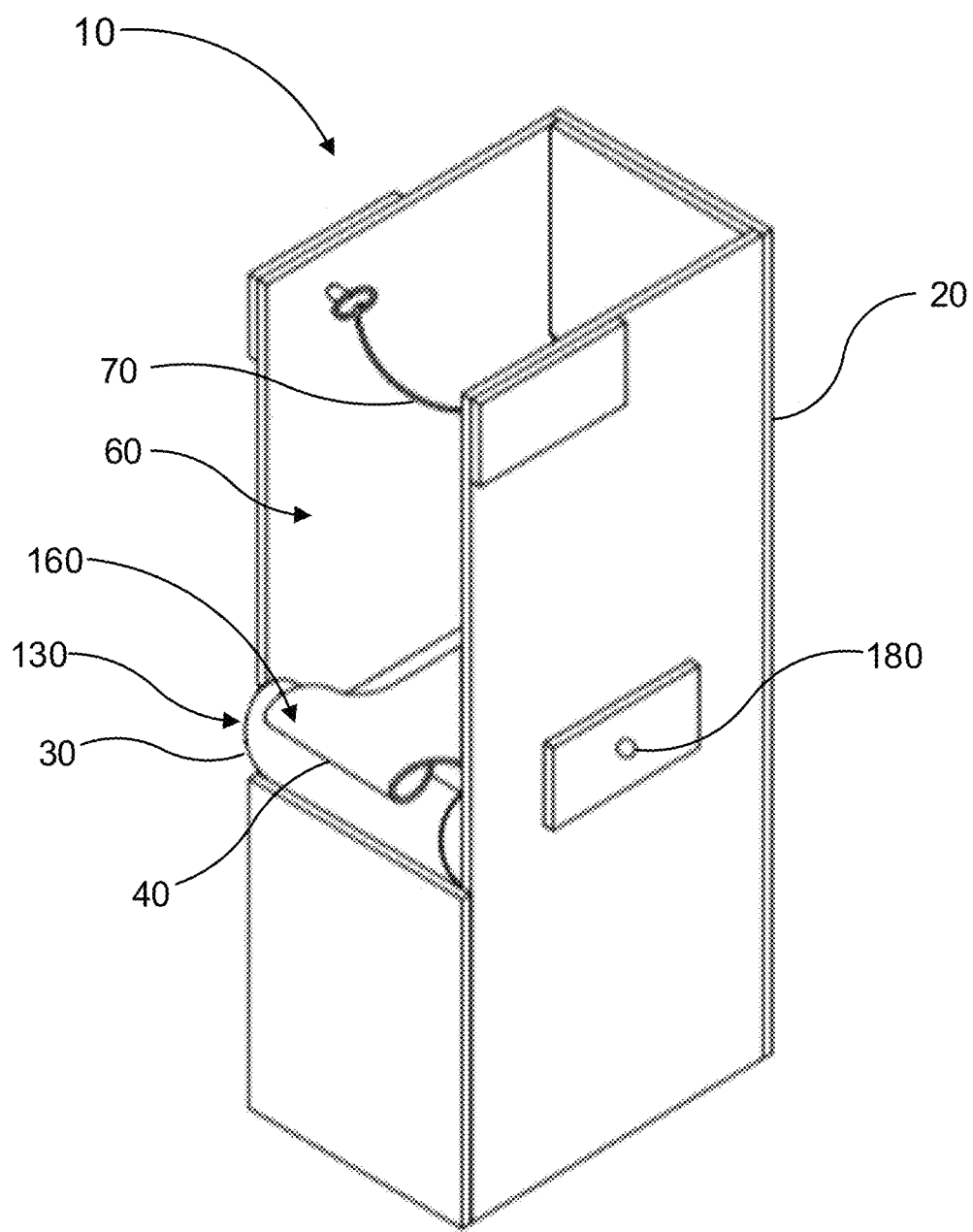
FIG. 1 shows a side perspective view of a livestock watering apparatus according to an embodiment of the present disclosure.

It is an objective of the present disclosure to provide an advantageous livestock watering apparatus. More particularly, it is an objective to provide livestock watering apparatuses suitable for use in remote pastures that may be installed with relative ease and that may be manufactured in a cost-effective manner.

An advantage of the livestock watering apparatuses of the present disclosure is that they do not require power sources, water lines, wet wells, pumps, etc. to provide livestock access to a water source during winter. The livestock watering apparatuses are therefore suitable for use in remote pastures, where limited infrastructure, if any, is available.

Another advantage of the livestock watering apparatuses of the present disclosure is that they are portable. Conventional livestock watering apparatuses are typically relatively large in size and constructed of heavy materials (e.g. concrete). In contrast, the livestock watering apparatuses of the present disclosure may be constructed from relatively lightweight materials and sized such that they may be easily transported and installed by a single person.

Yet another advantage of the livestock watering apparatuses of the present disclosure is that they are resistant to failure during harsh winter conditions (e.g. temperatures below −20° C.). As discussed herein, the livestock watering apparatuses of the present disclosure are positionable directly into a water source and do not require power sources, water lines, pumps, etc. As a result, there are fewer components that are prone to failure in harsh winter conditions. For example, the livestock watering apparatuses of the present disclosure do not include water lines, which are prone to freezing and subsequent bursting, or equipment such as pumps and generators that may have difficulty operating in such winter conditions.

Yet another advantage of the livestock watering apparatuses of the present disclosure is that they provide 24-hour access to drinking water, which, in turn, promotes optimal livestock health. This is especially beneficial during winter months and with larger herds, where it can be difficult to ensure that the livestock receive the proper amount of water.

Further advantages will be discussed below and will be readily apparent to those of ordinary skill in the art upon reading the present disclosure.

Reference will now be made in detail to example embodiments of the disclosure, wherein numerals refer to like components, examples of which are illustrated in the accompanying drawings that further show example embodiments without limitation.

In one embodiment, the present disclosure relates to a livestock watering apparatus comprising: a receptacle to be positioned in a water source, the receptacle having an open bottom region to be positioned within the water source and an opening in a side thereof to be positioned above and out of the water source, and the receptacle being at least partially insulated; and a lid for selectively accessing the water source, the lid being hingedly connected to of the receptacle and accessible through the opening in the side of the receptacle.

As used herein, the term "livestock watering apparatus" is meant to refer to a product for providing water to various types of livestock (e.g. cattle, horses, pigs, sheep, and the like). The livestock watering apparatuses of the present disclosure are positionable directly into a water source such as a slough, a lake, or a dugout. As will be appreciated by those of ordinary skill in the art, a "dugout" refers to a man-made water reservoir typically formed in the ground.

By "receptacle" it is meant a body or structure for containing therein water from the water source. The receptacle has an open bottom region to be positioned within the water source and an opening in a side thereof to be positioned above and out of the water source to thereby allow the livestock to access the water source. In more detail, when positioned in a water source, water enters the receptacle through the open bottom region such that it is contained therein. Livestock can then access the water in the receptacle via the opening in the side thereof. The shape of the receptacle is not limited and may be a rectangular prism, a cylinder, etc.

By "at least partially insulated" it is meant some or all of the receptacle is insulated. For example, a portion of the receptacle that is positioned in the water source may be insulated or, alternatively, the entire receptacle may be insulated. The insulation of the receptacle helps to prevent water contained therein from freezing. A variety of different types of insulation may be used, as described below.

By "an open bottom region" it is meant an opening in the receptacle that is positionable in a water source for receiving water therein. That is, the receptacle may comprise an opening in one or more sides of a bottom portion thereof that is positionable in the water source. As well or alternatively, the receptacle may comprise an open bottom—i.e. the opening may be located on the bottom of the receptacle. In such configurations the entire bottom of the receptacle may be open.

The lid is hingedly connected to the receptacle and is accessible through the opening in the side of the receptacle. Thus, in operation, the lid may be selectively opened by livestock in order to access water contained in the receptacle. In more detail, livestock may lift the lid with their head or nose and slide their head down into the receptacle to access the water contained therein. As well, the lid facilitates the protection of the water contained in the receptacle from, for example, weather elements such as precipitation (e.g. ice and snow) and wind, which may act to further cool the water when the watering apparatus is not in use by livestock.

Referring now to FIG. 1 to FIG. 6, a livestock watering apparatus is shown and is generally identified using the reference numeral 10. The watering apparatus 10 comprises a receptacle 20, a lid 30, and an optional grip 40.

The receptacle 20 comprises an open bottom region (not shown) to be positioned within the water source and an opening 60 in a side thereof to be positioned above and out of the water source. The open bottom region allows water from a water source to enter the receptacle 20 when positioned therein. The open bottom region may comprise an opening on a bottom of the receptacle 20. In such embodiments, such as in the illustrated embodiments, the bottom of the receptacle 20 may be entirely open. Once the receptacle 20 is positioned in the water source, the water may then be accessed (e.g. by livestock) through the opening 60. The walls of the receptacle 20 act as a windbreaker when the livestock use the watering apparatus 10 as well as serve to block other livestock from interfering when the watering apparatus 10 is in use.

Figure 2:
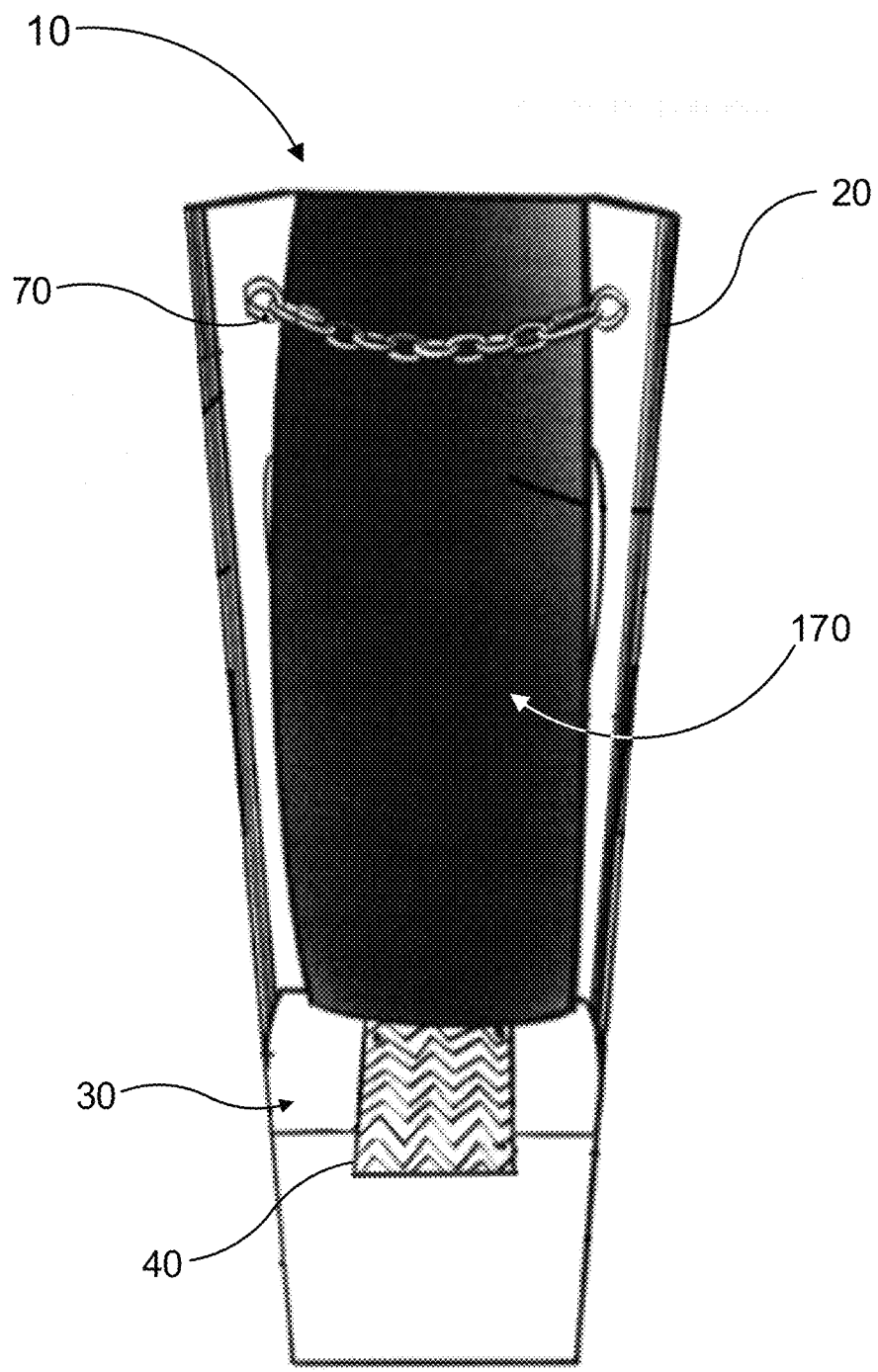
FIG. 2 shows a front perspective view of a livestock watering apparatus according to an embodiment of the present disclosure.

According to an embodiment, the receptacle 20 is comprised of a polyester, a vinyl ester, an epoxy, a polyurethane, or the like. While FIGS. 1 and 2 illustrate the body of receptacle 20 as being formed of separate components secured together (e.g. by way of one or more fasteners such as bolts, screws, adhesives, and the like), the receptacle 20 may also be formed as a single piece (i.e. the body may be monolithic). The body (or separate components thereof) of the receptacle 20 may be manufactured using any suitable method such as, for example, injection molding, rotational molding, extrusion molding, blow molding, etc. In a further embodiment, the receptacle 20 is a dark colour for absorbing sunlight in order to increase the temperature thereof. The colour of the receptacle 20 may be imparted during manufacture (e.g. dyed polymers) or, alternatively, the receptacle 20 may be coated after manufacture. The coating may be, for example, a solar-collecting paint. In a particular embodiment, the receptacle 20 is black.

In one embodiment, the opening 60 extends to the top of the receptacle 20, thereby providing the receptacle 20 with an open top, as illustrated in FIGS. 1 and 2. In such embodiments, the receptacle 20 may comprise additional structural features such as a supporting chain 70, which extends between two walls of the receptacle 20. The supporting chain 70 may prevent the walls of the receptacle 20 from separating enough to collapse the receptacle 20 (e.g. as caused by larger livestock). The supporting chain 70 may be secured to opposing walls of the receptacle 20 by any suitable means. It will be appreciated that other types of additional structural features may be used. For example, rather than the supporting chain 70, a support rod or beam may be secured to opposing walls of the receptacle 20.

Further, in embodiments where the receptacle 20 has an open top, the receptacle 20 may comprise a precipitation cover 170, as shown in FIG. 2. The precipitation cover 170 is formed of a flexible, waterproof material such as a polyurethane (e.g. a polyurethane laminate or a thermoplastic polyurethane), a polyester (e.g. a PVC-coated polyester), and the like, and is for blocking precipitation from landing on, and thus weighing down, the lid 30. In an embodiment the precipitation cover 170 is secured to a top edge of the receptacle 20 and to an end of the lid 30 that is opposite the end hingedly connected to the receptacle 20. Thus, in such embodiments, the precipitation cover 170 moves with the lid 30 as it opens and closes, thereby blocking precipitation from accumulating on the lid 30 regardless of the orientation thereof. As well, it is noted that the precipitation cover 170 may advantageously aid in training the livestock to use the grip 40 to open the lid 30, as the precipitation cover 170 also blocks the livestock from inserting their head above the lid 30.

In another embodiment, the opening 60 does not extend to the top of the receptacle 20 and the receptacle 20 has a closed top, as shown in FIGS. 3 to 6. In such embodiments, the receptacle 20 may not require additional structural features such as the supporting chain 70, as the closed top may, for example, prevent the walls of the receptacle from being separating from each other to thereby cause the receptacle 20 to collapse. In addition to providing additional support, the closed top of the receptacle 20 may advantageously prevent precipitation such as snow or ice from accumulating on the lid 30, which may prevent livestock from accessing the water source through the receptacle 20. As a result, while the precipitation cover 170 may still be included in such embodiments, it may not be required.

Figure 3:
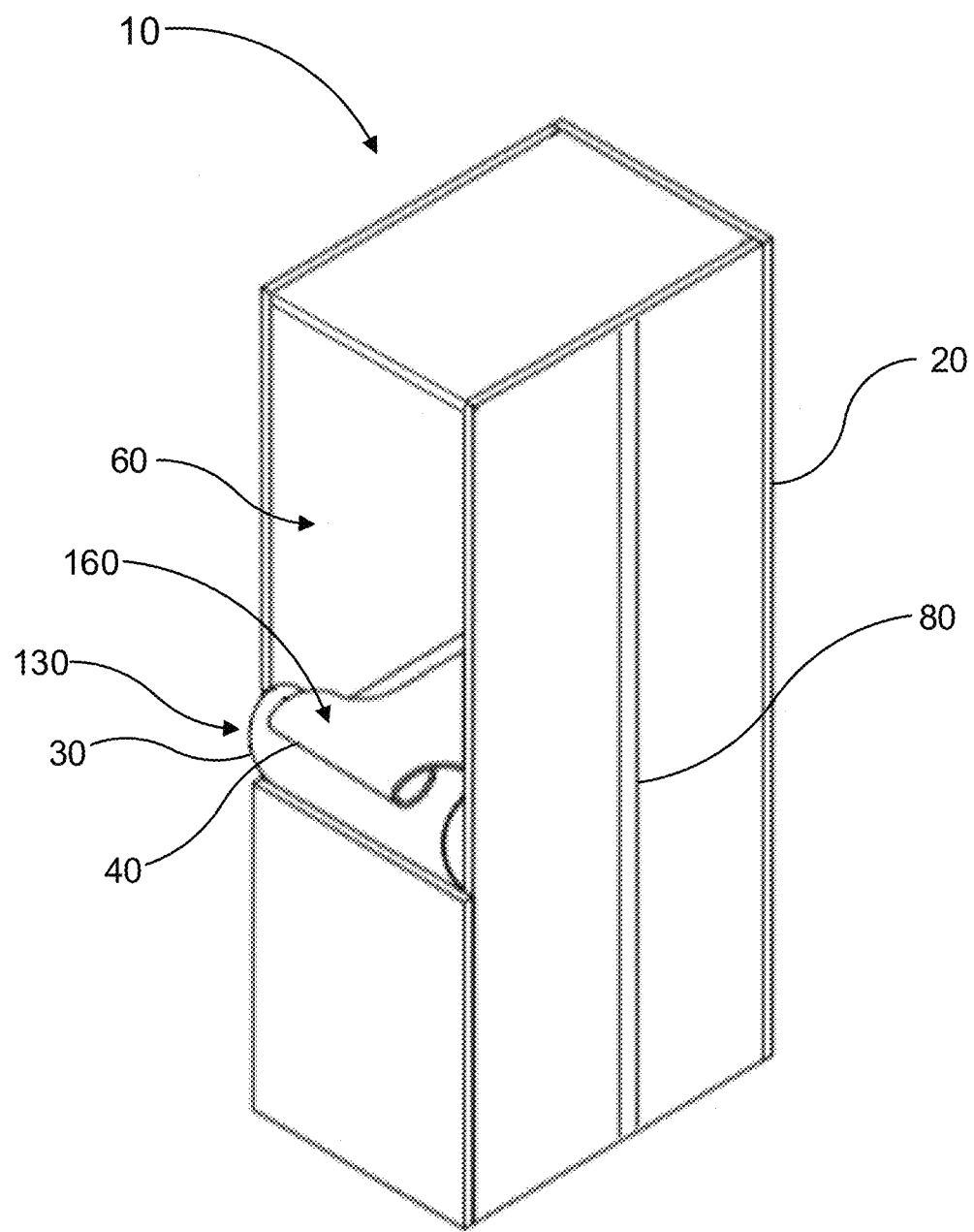
FIG. 3 shows a side perspective view of a livestock watering apparatus according to an embodiment of the present disclosure.
Figure 6:
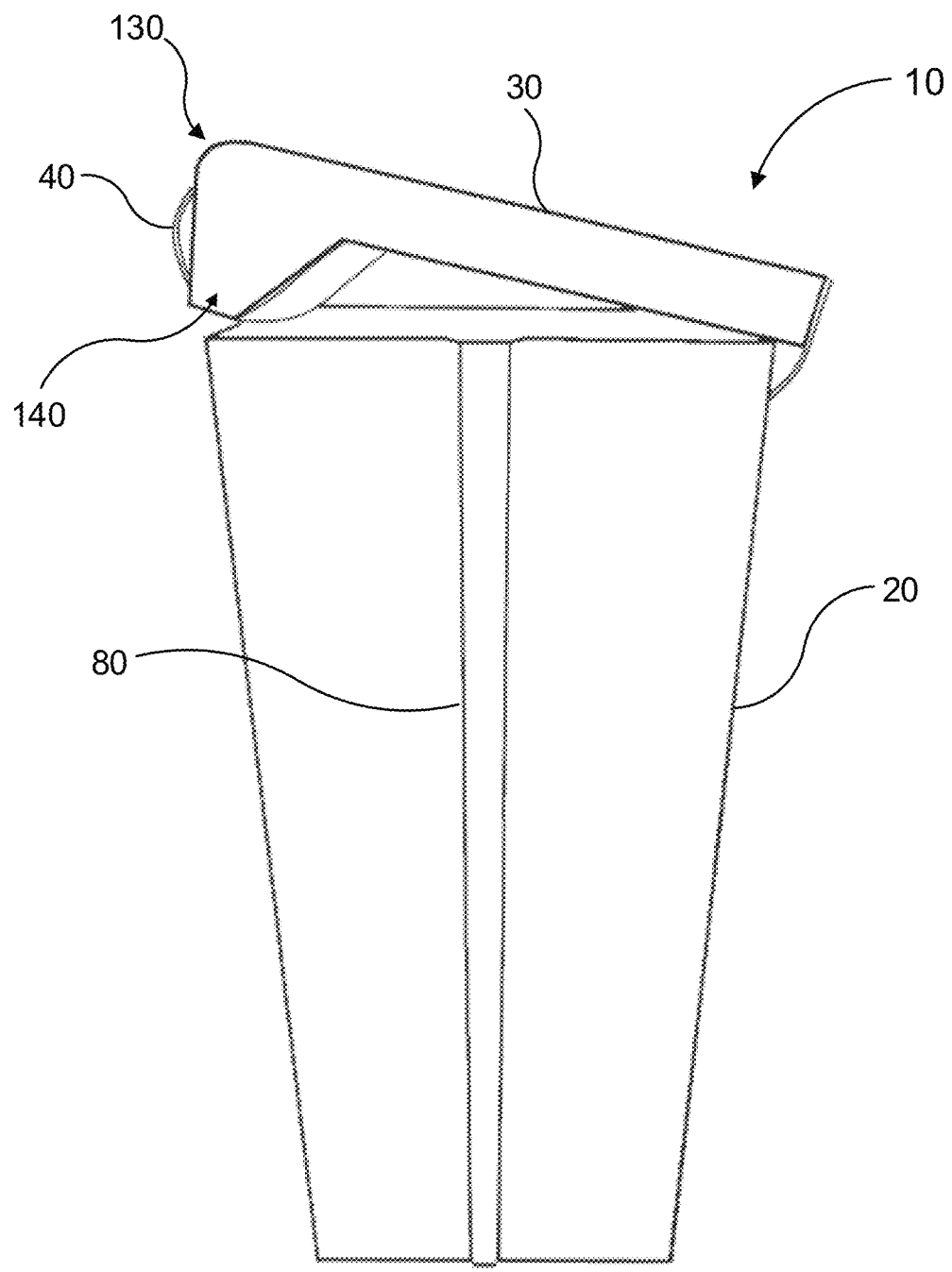
FIG. 6 shows a side perspective view of a livestock watering apparatus according to an embodiment of the present disclosure.

In a further embodiment, the receptacle 20 comprises one or more supporting ribs 80. The one or more supporting ribs 80 may extend vertically along the entire height (i.e. from top to bottom) of the receptacle 20, as shown in FIGS. 3 and 6, or, alternatively, may extend only along a portion of the height of the receptacle 20. The one or more supporting ribs 80 may be present on some (e.g. one side, two sides, three sides, four sides, etc.) or all of the sides of the receptacle 20. As well, while FIGS. 3 and 6 shows only a single supporting rib 80 on a side of the receptacle 20, there may be more than one supporting rib 80 per side of the receptacle 20.

In one embodiment, the one or more supporting ribs 80 are secured to an outer surface of the receptacle 20. In such embodiments, the supporting ribs 80 may be secured to the outer surface of the receptacle 20 by way of fasteners such as screws, bolts, and the like. In another embodiment, the one or more supporting ribs 80 may be integrally formed with the receptacle 20. That is, the one or more supporting ribs 80 may be formed in the walls of the receptacle 20 (e.g. molded into the walls) or may have the walls of the receptacle 20 formed therearound such that the one or more ribs 80 are contained within the walls of the receptacle 20. Thus, the one or more supporting ribs 80 may be formed of the same or different material than the walls of the receptacle 20. For example, the one or more supporting ribs 80 may be formed of a metal, a polymer, a wood, etc.

As discussed above, the receptacle 20 is at least partially insulated. In one embodiment, the receptacle 20 comprises an insulating layer 100. That is, the receptacle 20 may comprise a layer of insulating material disposed on an inner surface thereof (as shown in the illustrated embodiments) or on an outer surface thereof. The insulating layer 100 may comprise a waterproof insulation such as a high-density closed-cell foam or an extruded polystyrene for direct contact with the water source. Such insulting materials may be secured to the inner surface of the receptacle 20 through any suitable means.

Figure 5:
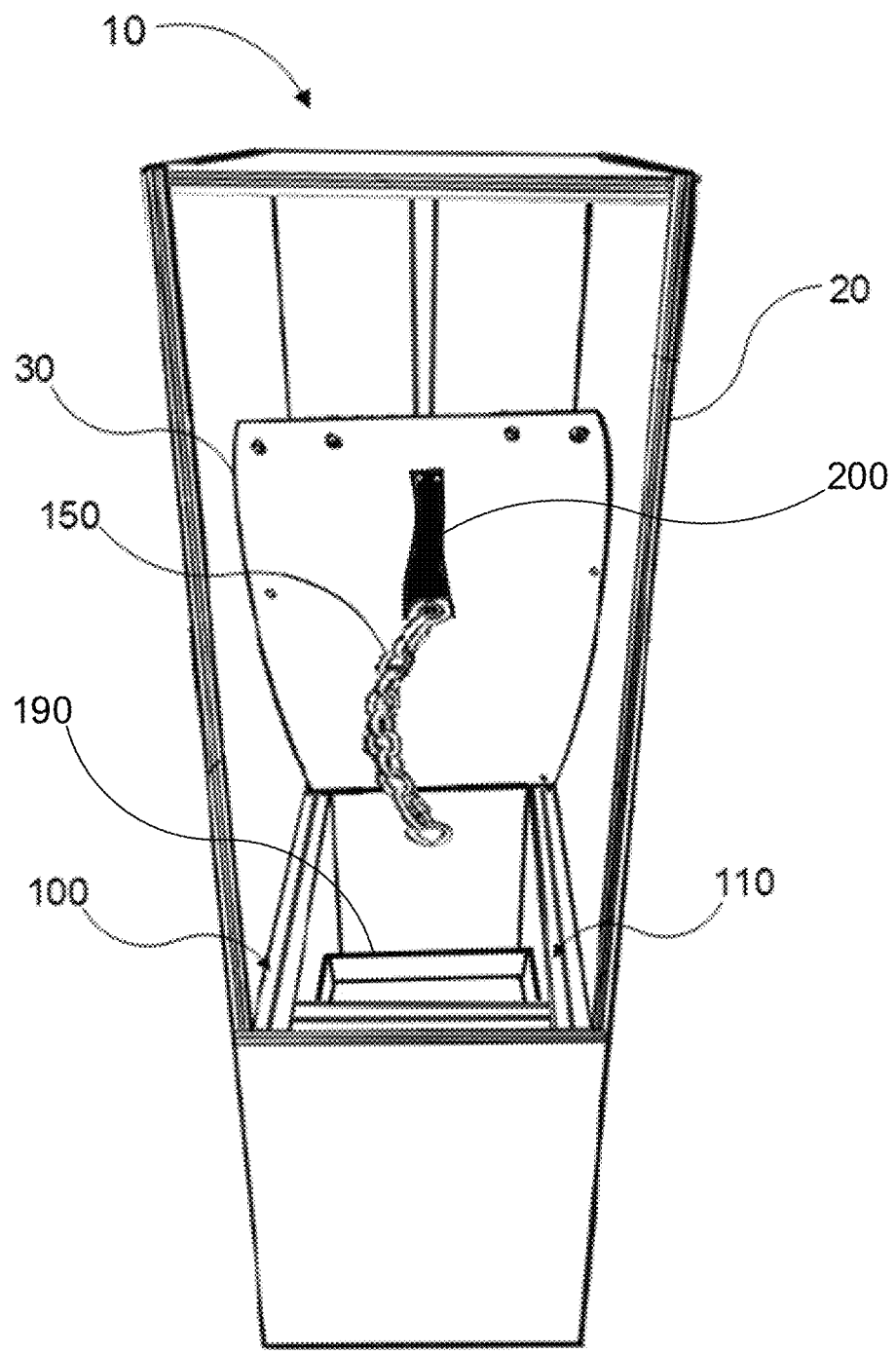
FIG. 5 shows a front perspective view of a livestock watering apparatus according to an embodiment of the present disclosure.

In other embodiments, the receptacle 20 comprises an inner layer 110 and the insulating layer 100 is secured between the inner layer 110 and one or more walls of the receptacle 20, as shown in FIG. 5. In such embodiments, the insulating layer 100 may be sealingly enclosed by the inner layer 110—i.e. water cannot access the insulating layer 100 when enclosed by the inner layer 110. As a result, the insulating layer 100 may comprise a variety of insulation materials that do not need to be waterproof. For example, in one embodiment the insulating layer 100 comprises a foam board, a rigid foam, a foamed-in-place insulation (e.g. a spray foam), or a structured insulated panel. In another embodiment, the insulating layer 100 comprises cellulose, fiberglass, a polyisocyanurate, a polystyrene, or any combination thereof. In such embodiments, the polystyrene may comprise an expanded polystyrene, an extruded polystyrene, or a combination thereof. In a further embodiment, the insulating layer 100 is injected, for example, between the inner layer 110 and the receptacle 20.

As previously described herein, the receptacle 20 may be partially insulated such that a portion of the receptacle that is positioned in the water source may be insulated or, alternatively, the entire receptacle may be insulated, for example. Thus, in one embodiment, the receptacle 20 comprises the insulating layer 100 on any portion of one or more walls to be positioned within the water source. In a further embodiment, the insulating layer 100 extends from the bottom of the receptacle to a height of about 60 cm to about 140 cm therein. Of course, as will be appreciated, the dimensions of the insulating layer may be greater or less than that range if desired for a particular purpose.

The inner layer 110 may be formed of the same or different material than the receptacle 20. For example, the inner layer 110 may independently comprise a polyester, a vinyl ester, an epoxy, a polyurethane, or the like. In embodiments where the inner layer 110 and the receptacle 20 are to be formed of the same material, the inner layer 100 and the receptacle 20 may be formed as a single integrated piece—i.e. as a monolithic component. In such embodiments, the insulating layer 100 may be injected between the inner layer 110 and the receptacle 20, for example.

Figure 4:
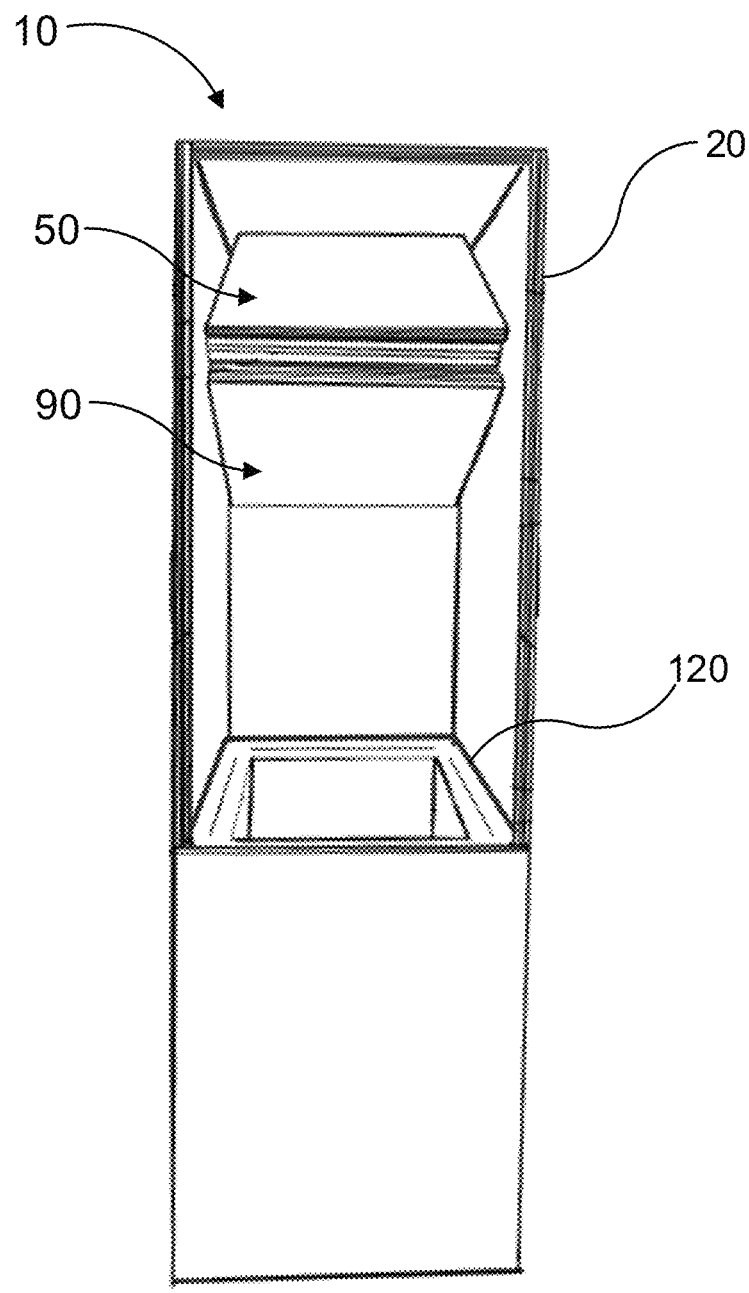
FIG. 4 shows a front perspective view of a livestock watering apparatus according to an embodiment of the present disclosure.

Further, the inner layer 110 and insulating layer 100 may define an edge for receiving thereon the lid 30 within the receptacle 20. That is, when the lid 30 is in a closed position (i.e. access to the water source is blocked), it rests on the edge. In an embodiment, the edge may extend around an inner perimeter of the receptacle (e.g. when the insulating layer 100 and inner layer 110 are present around the inner perimeter of the receptacle 20), as shown in FIGS. 4 and 5.

In a further embodiment, the inner layer 110 extends over an upper most side of the insulating layer 100 and forms a lip 120 (FIG. 4) abutting the inside surface of the receptacle 20. It is noted that, in such embodiments, the edge may thus be defined by the inner layer 110 extending over the insulating layer 100. In regards to the lip 120, the lip 120 extends vertically along the inside surface of the receptacle 20. The lip 120 may be useful for facilitating the sealing of the insulating layer 100 between the inner layer 110 and the inside surface of the receptacle 20. That is, the lip 120 may provide means to fasten a top portion of the inner layer 110 to the receptacle 20 by providing an area to which fasteners may be installed. For example, the lip 120 may provide a greater area to which a glue (e.g. an epoxy) may be applied or through which bolts or screws may be installed. As a result, a greater seal between the inner layer 110 and the receptacle 20 is attainable, thereby advantageously further protecting the insulating layer 100 contained therein from water as well as restricting the insulating layer 100 from swelling if exposed to water.

In a further embodiment, the receptacle 20 may comprise one or more apertures 180 in one or more sides thereof to facilitate the transportation of the livestock watering apparatus 10, as illustrated in FIG. 1. In more detail, the one or more apertures 180 are for receiving therethrough a rod, a pole, or the like. The rod, pole, etc. may be inserted into one or more apertures 180 of one receptacle 20 and into one or more apertures 180 of another receptacle 20 so that the two receptacles 20 may be carried together. Thus, such embodiments advantageously allow for two livestock watering apparatuses 10 to be deployed to a water source quickly and with relative ease. For additional stability, in some embodiments, the receptacle 20 comprises a pair of aligned apertures 180. In such embodiments, the rod, pole, etc. may be inserted through each of the pair of apertures 180 so that multiple sides of the receptacle 20 are supported by the rod, pole, etc. during transport.

In general, the receptacle 20 is dimensioned such that the open bottom region can be positioned in the water source while the opening 60 is positioned above a layer of ice so that livestock can access the water source therethrough. In an embodiment, the receptacle 20 has a height of about 1.2 m to about 1.8 m. In such embodiments, the opening 60 may have a height of about 0.6 m to about 0.8 m. Thus, a portion of the receptacle 20 that is positioned through a layer of ice and into the water source may have a height about 0.6 m to about 1.0 m.

Further, the receptacle 20 is also dimensioned such that livestock may fit their head thereinto to access the water source. As will be appreciated, the receptacle 20 may be different sizes for different types of livestock. In one embodiment, the receptacle has cross-sectional area of about 900 $cm^2$ to about 2800 $cm^2$. As well, the size of the opening 60 may also be selected based on the type of livestock using the watering apparatus 10. In some embodiments, the opening 60 has a size of about 2300 $cm^2$ to about 3000 $cm^2$. Of course, the dimensions of the receptacle 20 may be greater or less than those recited herein, depending on, for example, the depth of the water source, the size of the livestock, etc.

In regards to the lid 30, the lid 30 is configured to be operable by livestock such that they can access the water source as desired. In this manner, as discussed above, the lid 30 is hingedly connected to the receptacle 20 and is accessible through the opening in the side of the receptacle 20. In one embodiment, the lid 30 is hingedly connected to an inside surface of the receptacle 20. The hinged connection may be any suitable connection known in the art. For example, in one embodiment the hinged connection is formed by way of a metal hinge. In another embodiment, the hinged connection is formed by a flexible material secured to the lid 30 and the receptacle 20. In such embodiments, the flexible material may be, for example, a rubber, a fabric, or the like. Regardless of the type, the hinge may be secured to the lid 30 and the receptacle 20 by way of fasteners such as screws, bolts, etc.

The lid 30 may be formed of the same or different materials than the receptacle 20. That is, the lid 30 may independently comprise a polyester, a vinyl ester, an epoxy, a polyurethane, or the like. As well, the lid 30 may be monolithic in that it is formed of one piece. In other embodiments, the lid 30 may comprise one or more pieces secured together.

For example, as illustrated in FIG. 4, in one embodiment, the lid 30 comprises a first section 50 for selectively accessing the water source through the receptacle 20 and a second section 90 hingedly connected to the first section 50 and to the receptacle 20. Such embodiments allow the lid 30 to open further and to extend outwardly through the opening 60. This serves multiple purposes. For example, such configurations provide greater comfort for livestock with larger heads and/or longer necks, as they are less restricted by the angle at which the lid 30 opens. As well, such embodiments allow the lid 30 to be from within the receptacle 20 and stowed (e.g. for transport or cleaning). As shown in FIG. 6, the lid 30 may be stowed on the closed top of the receptacle 20. It is noted that, in embodiments where the receptacle 20 has an open top, the lid 30 may instead be stowed by hooking onto, for example, the support chain 70.

In a further embodiment, the lid 30 comprises one or more insulation materials. Including one or more insulation materials in the lid 30 may advantageously act to further insulate the water contained in the receptacle 20. The insulation materials may be the same or different from those previously described herein in relation to the insulating layer 100. That is, the insulation materials may comprise a polyisocyanurate, a polystyrene, or a combination thereof. In such embodiments, the polystyrene may comprise an expanded polystyrene, an extruded polystyrene, or a combination thereof. Further, in some embodiments (e.g. were the lid 30 is formed of a single piece), the one or more insulation materials are injected into the lid 30. The insulation materials may be injected using any known technique. Alternatively, in embodiments where the lid 30 formed of one or more pieces secured together, the insulation materials may comprise a foam board, a rigid foam, a foamed-in-place insulation, a structured insulated panel, cellulose, or fiberglass sandwiched between two pieces. As well, it is noted that, in embodiments where the lid 30 comprises the first section 50 and second section 90, the one or more insulation materials may be included in the first section 50 or both the first section 50 and second section 90.

Further, as illustrated in FIGS. 1 to 3 and 6, the lid 30 may comprise a curved end 130. The curved end 130 is opposite an end of the lid 30 that is hingedly connected to the receptacle 20 (or the second section 90, as described above). The curved end 130 may advantageously provide further comfort to the livestock using the livestock watering apparatus 10. In more detail, rather than contacting a sharp or hard edge of the lid 30, the livestock may instead contact the softer, rounded edge of the curved end 130. This may be particularity beneficial, as most livestock will open the lid 30 with their head or nose, which can be particularly uncomfortable if the edge is sharp.

Furthermore, the lid 30 may comprise a raised portion 140 on an upper surface thereof. The raised portion 140 may provide means for to elevate the grip 40, when present, in order to facilitate its use by the livestock. As well, the raised position may add additional, localized weight to the lid 30 in order to help maintain a seal when the lid 30 is closed as well as to help close the lid 30 after livestock are done using the watering apparatus 10, thereby minimizing the amount of heat lost when the lid 30 is open and closed. The raised portion 140 may be any suitable shape. As shown in FIG. 6, the raised portion 140 may be generally trapezoidal, but other shapes are possible and are contemplated. As well, it is noted that the raised portion 140 may be formed integrally with the lid 30 or may be a separate piece secured to the surface thereof.

In some embodiments, the lid 30 comprises a return spring (not shown) to facilitate the closing thereof. The return spring may be secured to the lid and an inner surface of the receptacle 20 such that, after the lid 30 is opened, it may be subsequently returned to a sealed, closed position by way of the return spring.

In a yet further embodiment, the lid 30 comprises an agitator 150 for agitating the water source when the lid 30 is transitioned between an open and closed position. That is, the agitator 150 causes the water in the receptacle 20 to move when the lid 30 is open or closed, which, in turn, prevents the water from freezing. The agitator 150 may comprise a chain secured to the bottom surface of the lid 30, as shown in FIG. 5. The agitator 150 may be secured to the bottom of the lid 30 using any suitable means known in the art. For example, in an embodiment the agitator 150 comprises a chain that is secured to the lid by a piece of material, e.g. a hook or a strap 200 (FIG. 5). The hook may for example be made of metal. The strap may for example be made of nylon, polyester, cotton, rubber, or any combination thereof. The chain of the agitator 150 may dangle straight down (such as in FIG. 5) or may be in a looped configuration. It is noted that the agitator 150 should be long enough that it dangles in the water when the lid 30 is closed. It is noted that other types of agitators are possible and are contemplated, so long as they do not interfere with the livestock drinking water through the lid 30.

In some embodiments, the livestock watering apparatus comprises a grip 40, as discussed above, secured to the lid 30. It is noted that, as used herein, the term "grip" refers to a component that may aid the opening and closing of the lid 30 by the livestock. In more detail, the grip 40 may provide a soft surface for the livestock to contact the lid 30, thereby protecting their nose and/or head when using the livestock watering apparatus 10. The grip may be formed of, for example, a rubber, a fabric, and the like. In an embodiment, the grip 40 hangs over the edge of the lid 30 used by livestock to open the lid 30. In further embodiment, the grip 40 comprises a looped portion 160 extending over an edge of the lid 30, as shown in FIGS. 1 and 2. The looped portion advantageously adds an extra layer of the grip 30 for increased livestock comfort when using the livestock watering apparatus 10.

In general, the grip 40 may be secured to the upper surface of the lid 30. In embodiments where the lid 30 comprises the raised portion 140, the grip 40 may be secured thereto. In some embodiments, one end of the grip 40 is secured to the upper surface of the lid 30 and another end of the grip 40 is secured to the bottom surface of the lid 30. As well, in embodiments where the lid 30 comprises the first section 50 and second section 90, the grip 40 may be secured to the first section 50. It is noted that the grip 40 may be secured to the lid 30 by any suitable means.

Further, in some embodiments, the livestock watering apparatus 10 comprises a removable feed tray 190 for storing thereon a livestock feed, the removable feed tray 190 being positionable within the receptacle 20, such as, for example, as shown in FIG. 5. It is noted that, as used herein, "livestock feed" encompasses dried feeds, mineral supplements, and any other suitable feeds for livestock that can be placed within the receptacle. The removable feed tray 190 may be positioned within the receptacle 20 at the bottom thereof (e.g. at the open bottom region) or at any point thereabove and below the lid, such that the livestock may access feed stored on the removable feed tray 190 in the same manner that they would access the water source described above.

According to one embodiment, the removable feed tray 190 may be independently comprised of the same or different materials as the receptacle 20. For example, the removable feed tray 190 may be comprised of a polyester, a vinyl ester, an epoxy, a polyurethane, or any combination thereof, independent of the material(s) used to form the receptacle 20. In an embodiment, the feed tray is comprised of metal or a plastic. In a further embodiment, the removable feed tray 190 may be dimensioned to facilitate easy installation and removal from the receptacle 20. For example, the removable feed tray 190 may have the same shape as a cross-section of the receptacle 20, so that it may be easily positioned in the receptacle 20 and easily removed therefrom.

Thus, in operation, the livestock watering apparatus 10 may be positioned in a water source to thereby provide access to the water source to livestock. The present disclosure therefore further provides a use of the livestock watering apparatus described herein for watering livestock.

It is another objective of the present disclosure to provide an advantageous combination livestock watering and feed apparatus. More particularly, it is an objective to provide a combination livestock watering and feed apparatus suitable for use in remote pastures that may be installed with relative ease and that may be manufactured in a cost-effective manner.

According to one embodiment of the present disclosure, there is provided combination livestock watering and feed apparatus comprising: a receptacle having an open bottom region for being positioned in a water source and an opening in a side thereof for being positioned above and out of the water source, and the receptacle being at least partially insulated; a removable feed tray for storing thereon a livestock feed, the removable feed tray to be positioned within the receptacle when the receptacle is positioned out of the water source; and a lid for selectively accessing the water source or the removable feed tray, the lid being hingedly connected to the receptacle and accessible through the opening in the side of the receptacle.

Advantageously, the receptacle of the combination watering and feed apparatus may be configured in the same manner as described above in relation to the receptacle 20. As well, the removable feed tray may be configured in the same manner as described above in relation to the removable feed tray 190. As a result, the receptacle of the combination watering and feed apparatus may afford the same advantages previously described herein while additionally being adaptable to feed livestock when the receptacle is positioned out of a water source (e.g. on dry land during seasons other than winter). As a further benefit, the livestock need only learn how to use one type of apparatus for both feeding and watering, which means ranchers and producers do not need to spend additional time training livestock to learn a new apparatus for their feeding and/or watering.

A single rancher or producer may employ multiple of the combination watering and feed apparatuses on their property, with some being placed in a water source in a watering configuration and others being placed on dry land in a feed configuration. In the summer months when the natural water sources are not frozen, one or more of the combination watering and feed apparatuses may be converted from the watering configuration to the feed configuration since water will be readily available to the livestock from natural water sources that are not frozen.

It is another objective of the present disclosure to provide an advantageous method for watering livestock. More particularly, it is an objective to provide methods for watering livestock that are suitable for use in remote pastures in that they may be performed quickly, with relative ease, and a minimum amount of times to provide sufficient water to the livestock.

One advantage of the methods of the present disclosure is that they may only need to be performed once per winter season. Conventional methods for watering livestock in remote pastures typically involve forming one or more holes in ice through which livestock may access a water source. However, as the holes in the ice are prone to re-freezing, ranchers or producers are often required to reform the holes every 1 to 5 days. In contrast, the methods of the present disclosure involve inserting an at least partially insulated receptacle into a hole in a layer of ice, which maintains access to a water source, even if the ice re-freezes therearound. As a result, holes in the ice do not need to be re-formed every 1 to 5 days and may instead last the entire winter season.

Another advantage of the methods of the present disclosure is that they do not require power sources, water lines, pumps, etc. As a result, the methods for watering livestock disclosed herein are resistant to failure during harsh winter conditions (e.g. temperatures below −20° C.). This means that, not only are the methods less expensive to perform, they also do not rely on equipment that may need to be maintained throughout a winter season, which is particularly advantageous for remote pasture applications.

Further advantages will be discussed below and will be readily apparent to those of ordinary skill in the art upon reading the present disclosure.

In one embodiment, the present disclosure relates to a method for watering livestock, the method comprising: inserting into a hole in a layer of ice formed on a water source an at least partially insulated receptacle having an open bottom region and an opening in a side thereof such that the open bottom region is positioned in the water source and the opening is positioned above the layer of ice, wherein the receptacle comprises a lid that is hingedly connected to the receptacle for allowing the livestock to selectively access the water source through the opening in the side thereof.

It is noted that the receptacle and the lid may be configured in the same manner as described above in relation to the receptacle 20 and the lid 30.

According to an embodiment, the methods of the present disclosure may further comprise forming the hole in the layer of ice. In such embodiments, the forming of the hole in the layer of ice comprises drilling or cutting the hole into the ice. The drilling or cutting of the hole may be completed using any suitable equipment or techniques known in the art. The hole is dimensioned such that the at least partially insulated receptacle may be inserted therethrough and not so large that the receptacle may be shifted significantly (e.g. by the livestock or the wind) once positioned in the hole.

The inserting of the receptacle into the hole formed in the layer of ice may be done using any suitable equipment or technique. However, as described above in relation to the livestock watering apparatus 10, the receptacle may be lightweight enough such that a single person is capable of inserting the receptacle into the hole without the need of lifting equipment, another person, etc.

The water source is generally deep enough that, once the receptacle is inserted thereinto, the water source may raise to a depth therein sufficient for livestock to access. For example, the water source may be a slough, a lake, a dugout, etc.

Further, as previously described herein, the type of livestock to be watered by the methods of the present disclosure is not particularly limited. In one embodiment, the livestock comprise cattle, pigs, sheep, horses, or a combination thereof. Of course, the methods may be suitable for other types of livestock.

It is another objective of the present disclosure to provide advantageous methods of training livestock to use the livestock watering apparatuses disclosed herein. More particularly, it is an objective of the present disclosure to provide methods for training livestock to use livestock watering apparatuses that may be performed relatively easily and in a relatively short time frame.

Thus, according to one embodiment of the present disclosure, there is provided a method of training livestock to use a livestock watering apparatus, the method comprising: providing livestock access to the watering apparatus as described herein or the combination livestock watering and feed apparatus as described herein; and maintaining in an open position the lid to thereby allow the livestock to access the inside of the receptacle through the opening in the side of the receptacle.

In an embodiment, the methods of training further comprise a step of closing the lid to provide selective access to the inside of the receptacle, whereby the livestock must learn to open the lid on its hinged connection to access the inside of the receptacle. Typically, livestock will learn to do this on their own. However, in some embodiments, the methods may comprise steps of demonstrating the opening of the lid. In other embodiments, livestock that are already familiar with the apparatus may be mixed with the livestock to be trained, such that the livestock that are being trained will learn be watching other animals access the receptacle.

It is noted that the receptacle and lid may be configured in the same manner as previously described herein in relation to the receptacle 20 and lid 30, respectively.

As will be appreciated, maintaining the lid in an open position to allow the livestock to access the inside of the receptacle, and the water or feed therein, will teach them that there is sustenance contained within the receptacle. Due to the configuration of the receptacle, which may be easily understood and used by livestock, the methods for training the livestock may advantageously be completed with a minimum amount of steps and in a minimum amount of time. For example, in some embodiments, the maintaining of the lid in the open position is for at least 24 hours. In an embodiment, the maintaining of the lid in the open position is for at least 1 day, at least 2 days, at least 3 days, at least 4 days, at least 5 days, at least 6 days, at least 7 days, or longer. In an embodiment, after the step of maintaining the lid in the open position, the lid is closed to train the livestock to use the lid. Upon closing the lid, livestock may be trained to use the lid to access the receptacle within 24 hours. In an embodiment, livestock may be trained to use the lid to access the receptacle within at least 1 day, at least 2 days, at least 3 days, at least 4 days, at least 5 days, at least 6 days, at least 7 days, or longer.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of" or "consist of the various components and steps". Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A livestock watering apparatus comprising:
a receptacle to be positioned in a water source, the receptacle having an open bottom region to be positioned within the water source and an opening in a side thereof to be positioned above and out of the water source, and the receptacle comprising an insulating layer and an inner layer, wherein the insulating layer is positioned between the inner layer and one or more walls of the receptacle; and
a lid for selectively accessing the water source, the lid being hingedly connected to the receptacle and accessible through the opening in the side of the receptacle, wherein the inner layer and the insulating layer define an edge receiving thereon the lid within the receptacle.

2. The watering apparatus of claim 1, wherein the receptacle is configured to be positioned in the water source through a layer of ice.

3. The watering apparatus of claim 1, wherein the insulating layer is sealingly enclosed by the inner layer.

4. The watering apparatus of claim 1, wherein:
the inner layer comprises a polyester, a vinyl ester, an epoxy, a polyurethane, or any combination thereof; and/or
the insulating layer comprises a foam board, a rigid foam, a foamed-in-place insulation, or a structured insulated panel.

5. The watering apparatus of claim 1, wherein the insulating layer comprises cellulose, fiberglass, a polyisocyanurate, a polystyrene, or any combination thereof.

6. The watering apparatus of claim 1, wherein the receptacle further comprises one or more supporting ribs.

7. The watering apparatus of claim 1, wherein the lid comprises one or more insulation materials.

8. The watering apparatus of claim 7, wherein the one or more insulation materials comprise a polyisocyanurate, a polystyrene, or a combination thereof.

9. The watering apparatus of claim 1, wherein the lid is hingedly connected to an inside surface of the receptacle.

10. The watering apparatus of claim 1, wherein the lid comprises a curved end, the curved end being opposite an end hingedly connected to the receptacle.

11. The watering apparatus of claim 1, further comprising a grip secured to the lid to aid livestock in opening and closing the lid.

12. The watering apparatus of claim 11, wherein the grip is secured to a raised portion on an upper surface of the lid.

13. The watering apparatus of claim 11, wherein the grip comprises a looped portion extending over an edge of the lid.

14. The watering apparatus of claim 11, wherein the grip comprises a rubber, a fabric, or a combination thereof.

15. The watering apparatus of claim 1, wherein the lid comprises a first section for selectively accessing the water source through the open bottom of the receptacle, and a second section hingedly connected to the first section and to the receptacle.

16. The watering apparatus of claim 1, wherein the lid comprises an agitator for agitating the water source when the lid is transitioned between an open and closed position.

17. The watering apparatus of claim 16, wherein the agitator comprises a chain secured to a bottom surface of the lid.

18. A combination livestock watering and feed apparatus comprising:
    a receptacle having an open bottom region for being positioned in a water source and an opening in a side thereof for being positioned above and out of the water source, and the receptacle comprising an insulating layer and an inner layer, wherein the insulating layer is positioned between the inner layer and one or more walls of the receptacle;
    a removable feed tray for storing thereon a livestock feed, the removable feed tray to be positioned within the receptacle when the receptacle is positioned out of the water source; and
    a lid for selectively accessing the water source or the removable feed tray, the lid being hingedly connected to the receptacle and accessible through the opening in the side of the receptacle, wherein the inner layer and the insulating layer define an edge receiving thereon the lid within the receptacle.

19. A method for watering livestock, the method comprising:
    inserting into a hole in a layer of ice formed on a water source an at least partially insulated receptacle having an open bottom region and an opening in a side thereof such that the open bottom region is positioned in the water source and the opening is positioned above the layer of ice,
    wherein the receptacle comprises a lid that is hingedly connected to the receptacle for allowing livestock to selectively access the water source through the opening in the side thereof.

\* \* \* \* \*